R. J. MILLEN.
Log or Bull Chain.

No. 213,769.  Patented April 1, 1879.

Witnesses:  Inventor:
T. C. Brecht.  Robert J. Millen
J. Mason Boozler  By N. Cranford,
 Attorney.

N. PETERS, PHOTO-LITHOGRAPHER, WASHINGTON, D. C.

UNITED STATES PATENT OFFICE.

ROBERT J. MILLEN, OF MUSKEGON, MICHIGAN.

IMPROVEMENT IN LOG OR BULL CHAINS.

Specification forming part of Letters Patent No. 213,769, dated April 1, 1879; application filed February 15, 1879.

*To all whom it may concern:*

Be it known that I, ROBERT J. MILLEN, of Muskegon, in the county of Muskegon, and in the State of Michigan, have invented certain new and useful Improvements in Bull or Jack Chains, of which the following is a specification:

This invention relates to that class of chains used in saw-mills for drawing logs from the water or other position onto the log-deck, ready to be rolled from the deck onto the saw-mill carriage; and it consists in the construction of the chain for that purpose, as will be fully hereinafter described.

Figure 1:
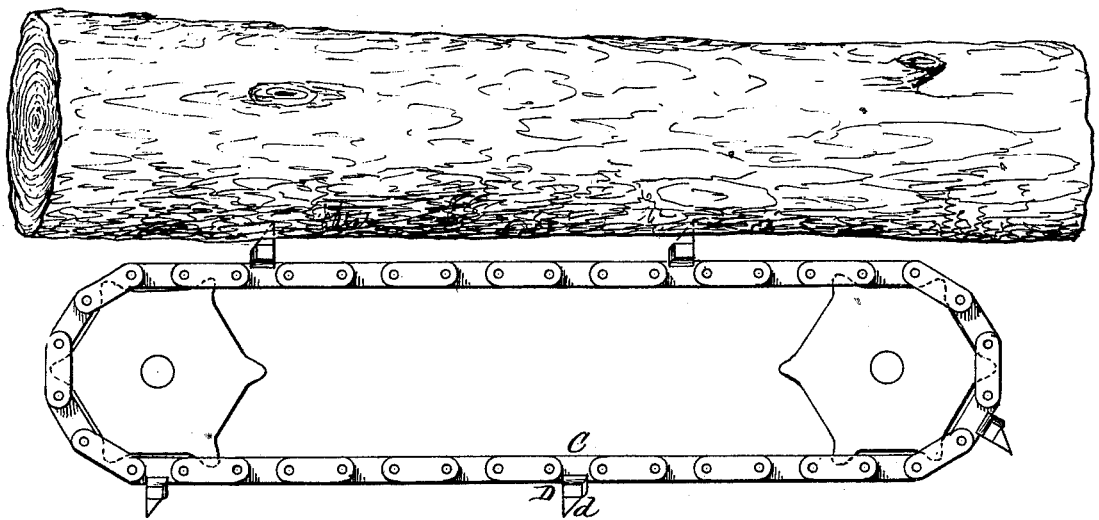
Figure 2:
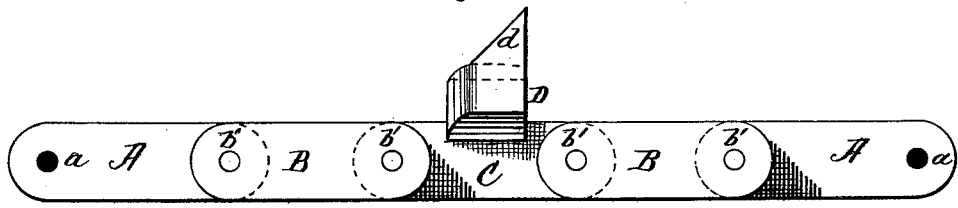
Figure 3:
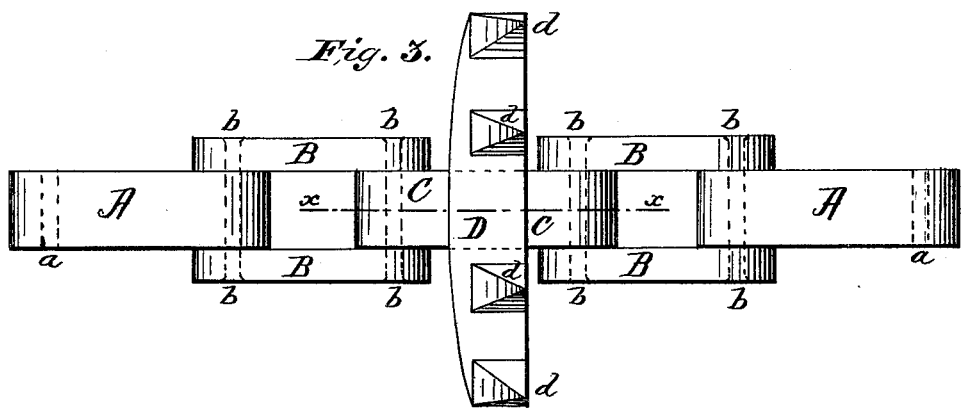
Figure 4:
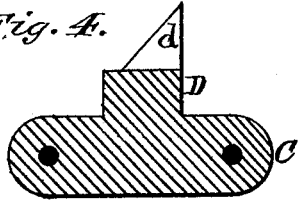

In the drawings, Figure 1 represents a side view of the chain in operation; Fig. 2, a side view of an enlarged section of same; Fig. 3, a top view of Fig. 2; and Fig. 4, a side sectional view of the dog or toothed link on line $x\ x$, Fig. 3.

The chain is formed of a series of solid single-bar links and pairs of double or side links, pivoted together to form an endless chain and be flexible, and to have an opening or space between the inner sides of the side links and between the ends of the single-bar links, as seen in Fig. 3.

A A are the middle solid-bar links, pivoted at each end to the side links, B B, by the pivot-pins $b\ b$, that pass through holes $b'\ b'$ in the ends of links B, and through holes $a$ in the solid links A.

At proper distances apart in the length of the chain there is inserted, in the place of solid-bar links A, a solid link, C, having the saddle D formed thereon and at right angles thereto, and having upwardly-projecting teeth $d$ on the upper side, to take into the log or other substance to be moved by the chain.

The saddle D is concave on its upper surface; consequently the upwardly-projecting teeth are concave on the line of their points, for the purpose of holding a round log upon the saddle of the chain and preventing its rolling off at the side when being drawn into the mill; or the saddle and points of the teeth may be straight.

The solid link C, with the saddle D and its teeth $d$, are formed in one piece of metal, which may be cast or forged from wrought metal, as is most desirable or convenient.

A chain formed, as described and shown, with the upwardly-projecting teeth to take into the log confined to the transverse saddle-links will hold the log, and especially if the log is crooked or irregular in form, firmly in its bed, without danger of displacement or the log rolling off the saddles, as the number of the bearing-points of the log upon the chain are reduced as to locality; for, as a general rule, the log should be so placed upon the toothed saddles that there would be but two bearing-points, as shown in Fig. 1.

Other forms of links than what is herein described may be used in the chain, as I lay no claim to a chain formed with the links A A and B B, as they are in common use in chains for various purposes; but What I do claim as my invention, and desire to secure by Letters Patent, is—

1. In a bull or jack chain, the solid link C, having the right-angled saddle D and teeth $d$ thereon in a single solid piece of metal, as and for the purposes described.

2. In a bull or jack chain, the solid link C, having the right-angled saddle D and teeth $d$ thereon in a single piece of metal, in combination with the side links, B B, and intermediate links, A, constructed to operate as described.

ROBERT J. MILLEN.

Witnesses:
 JAMES HARRY CAVANAUGH,
 A. F. TEMPLE.